United States Patent
Zhang et al.

(10) Patent No.: US 7,733,969 B2
(45) Date of Patent: Jun. 8, 2010

(54) CYCLIC TRAINING SEQUENCE GENERATING METHOD, COMMUNICATION SYSTEM AND COMMUNICATION METHOD

(75) Inventors: Zhongshan Zhang, Beijing (CN); Hidetoshi Kayama, Beijing (CN)

(73) Assignee: NTT Docomo, Inc., Tokyo (JP)

( * ) Notice: Subject to any disclaimer, the term of this patent is extended or adjusted under 35 U.S.C. 154(b) by 992 days.

(21) Appl. No.: 11/439,933

(22) Filed: May 23, 2006

(65) Prior Publication Data

US 2006/0269007 A1 Nov. 30, 2006

(30) Foreign Application Priority Data

May 24, 2005 (CN) .................. 2005 1 0071816

(51) Int. Cl.
*H04K 1/10* (2006.01)
(52) U.S. Cl. ..................................... 375/260
(58) Field of Classification Search ................ 375/149, 375/260, 340, 342–343, 346; 370/500, 503, 370/509, 514–515
See application file for complete search history.

(56) References Cited

U.S. PATENT DOCUMENTS

| | | | |
|---|---|---|---|
| 5,732,113 A | 3/1998 | Schmidl et al. | |
| 6,421,372 B1 * | 7/2002 | Bierly et al. | 375/143 |
| 7,068,631 B2 * | 6/2006 | Eriksson et al. | 370/337 |
| 2002/0037061 A1 * | 3/2002 | Learned | 375/346 |

FOREIGN PATENT DOCUMENTS

| | | |
|---|---|---|
| WO | WO 00/11813 | 3/2000 |
| WO | WO 2005/022797 A2 | 3/2005 |

OTHER PUBLICATIONS

European Search Report dated Feb. 2, 2008; EP Patent Application No. 06010257.1.,.
Deliang, et al., "An Efficient Joint Synchronization Acquisition Algorithm for OFDM," Microwave and Millimeter Wave Technology, 2004. ICMMT 4th International Conference on, Proceedings Beigiing, China, Aug. 18-21, 2004, Piscataway, NJ, USA, IEEE, Aug. 18, 2004, pp. 813-817, XP010797492, ISBN: 0-7803-8401-6..

(Continued)

*Primary Examiner*—Khanh C Tran
(74) *Attorney, Agent, or Firm*—Blakely, Sokoloff, Taylor & Zafman LLP

(57) ABSTRACT

A method for generating a cyclic training sequence comprises the following steps: generating randomly the first information block with the length N, copying the last L samples of the first information block to the beginning of the block as the first CP, generating the second information block with the length N by using the first information block of the training symbol in a circle manner in which the last d samples of the first information block are shifted to the position before the rest (N−d) samples and the N samples thus rearranged forms the second information block, copying the last L samples of the second information block to the beginning of the block as the second CP to form the integrated cyclic training sequence.

6 Claims, 9 Drawing Sheets

OTHER PUBLICATIONS

Mestre, et al., "Asymptotic Performance Evaluation of Space-Frequency MMSE Filters for OFDM," IEEE Transactions on Signal Processing, IEEE Service Center, New York, NY, US., vol. 52, No. 10, Oct. 2004, pp. 2895-2910, XP011118373, ISSN: 1053-587X..

Zhang, et al., "High Accuracy Frequency Offset Correction with Adjustable Acquisition Range in OFDM Systems," Jan. 2005, IEEE Transactions on Wireless Communications, IEEE Service Center, Piscataway, NJ, US, pp. 228-237, XP011124956 ISSN: 1536-1276..

Zhang, et al., Frequency Offset Estimation with Fast Acquisition in OFDM System, Mar. 2004, IEEE Communications Letters, IEEE Service Center, Piscataway, NJ, US pp. 171-173, XP011109555.

Jiang, et al., "Low Complexity Frequency Offset Estimator for OFDM with Time-Frequency Training Sequence," Commnhnications 2005, ICC 2005, 2005 IEEE International Conference on Seoul, Korea May 16-20, 2005, pp. 2553-2557, XP010825648.

* cited by examiner

CYCLIC TRAINING SEQUENCE GENERATING METHOD, COMMUNICATION SYSTEM AND COMMUNICATION METHOD

PRIORITY

The present patent application claims priority to and incorporates by reference the corresponding Chinese patent application serial no. 200510071816.4, titled, "A Cyclic Training Sequence Generating Method, Communication System and Communication Method," filed on May 24, 2005.

BACKGROUND OF THE INVENTION

1. Field of the Invention

The present invention relates to a cyclic training sequence group for uplink/downlink synchronization in the multiuser system, e.g., a Round-Robin training sequence group, and especially relates to a communication system and communication method using the cyclic training sequence group.

2. Description of the Related Art

Currently, there are many classical synchronization algorithms for performing downlink synchronization [1]-[7]. However, uplink synchronization is generally more difficult in the multiuser system, especially when a plurality of users adopt full-multiplexing transmission mode, because in uplink transmission, different users are different distances from the base station, which will introduce different timing offsets with respect to the base station. In addition, different users use different oscillators and the central frequencies of these oscillators may be different; and the moving speeds of different users are different so that different Doppler frequency offsets are formed. The above two reasons lead to users having different carrier frequency offsets with respect to the same base station.

Many classical algorithms utilize the repeated information in the training sequence to perform timing synchronization and carrier frequency offset estimation. At the base station, there will be a phase angle deviation between the repeated information in the training sequence due to the influence of the carrier frequency offset, which can be used to estimate the carrier frequency offset of the user. In the multiuser system adopting full-multiplexing transmission mode, when the training sequences transmitted by different users overlap at the base station, if these training sequences are identical or partially identical in structure, the corresponding phase angle deviation will contain a plurality of users' carrier frequency offset information, i.e., the carrier frequency offset information of a single user will be lost. The interference between training sequences may lead to the failure of the synchronization algorithm of some users.

REFERENCES [1]-[7]

[1] J.-J. van de Beek and M. Sandell, "ML estimation of timing and frequency offset in OFDM systems," IEEE Trans. Signal Processing, vol. 45, pp. 1800-1805, July 1997;

[2] H. Nogami and T. Nagashima, "A frequency and timing period acquisition technique for OFDM system," Personal, Indoor and Mobile Radio Commun. (PIMRC), pp. 1010-1015, Sep. 27-29, 1995;

[3] M. Morelli and V. Mengali, "An improved frequency offset estimator for OFDM applications," IEEE Commun. Lett., vol. 3, pp. 75-77, March 1999;

[4] T. Keller and L. Piazzo, "Orthogonal Frequency Division Multiplex Synchronization Techniques for Frequency-Selective Fading Channels," IEEE Journal on Selected Areas in Communications, vol. 19, No. 6, pp. 999-1008, June 2001;

[5] T. M. Schmidl and D. C. Cox, "Robust Frequency and Timing Synchronization for OFDM," IEEE Trans. Comm., vol. 45, pp. 1613-1621, December 1997;

[6] P. H. Moose, "A technique for orthogonal frequency division multiplexing frequency offset correction," IEEE Trans. Comm., vol. 42, pp. 2908-2914, October 1994;

[7] Z. Zhang and M. Zhao, "Frequency offset estimation with fast acquisition in OFDM system," IEEE Commun. Lett., vol. 8, pp. 171-173, Mar. 2004.

Since the interference and distortion between training sequences of different users may lead to the failure of uplink timing synchronization of some users, a new group of reliable training sequences is needed to reduce the interference and distortion between different users in the multiuser full-multiplexing transmission uplink synchronization system.

SUMMARY

A cyclic training sequence generating method, communication system and communication method are described. In one embodiment, the method for generating a cyclic training sequence with a first training symbol and a second training symbol sequentially, where the first training symbol includes a first CP and a first information block sequentially and the second training symbol includes a second CP and a second information block sequentially, comprises generating randomly the first information block with the length N, wherein N is a natural number and copying the last L samples of the first information block to the beginning of the block as the first CP, wherein L is a natural number less than N. The method also includes generating the second information block with the length N by the first information block of the first training symbol in a circular manner in which the last d samples of the first information block are shifted to the position before the rest (N−d) samples and the N samples thus rearranged forms the second information block, wherein the corresponding relation between the first and second information blocks is the structure characteristic of the cyclic training sequence, and d is 0 or any natural number less than N. The method further comprises copying the last L samples of the second information block to the beginning of the block as the second CP to form the integrated cyclic training sequence.

DETAILED DESCRIPTION OF THE PRESENT INVENTION

Figure 1:
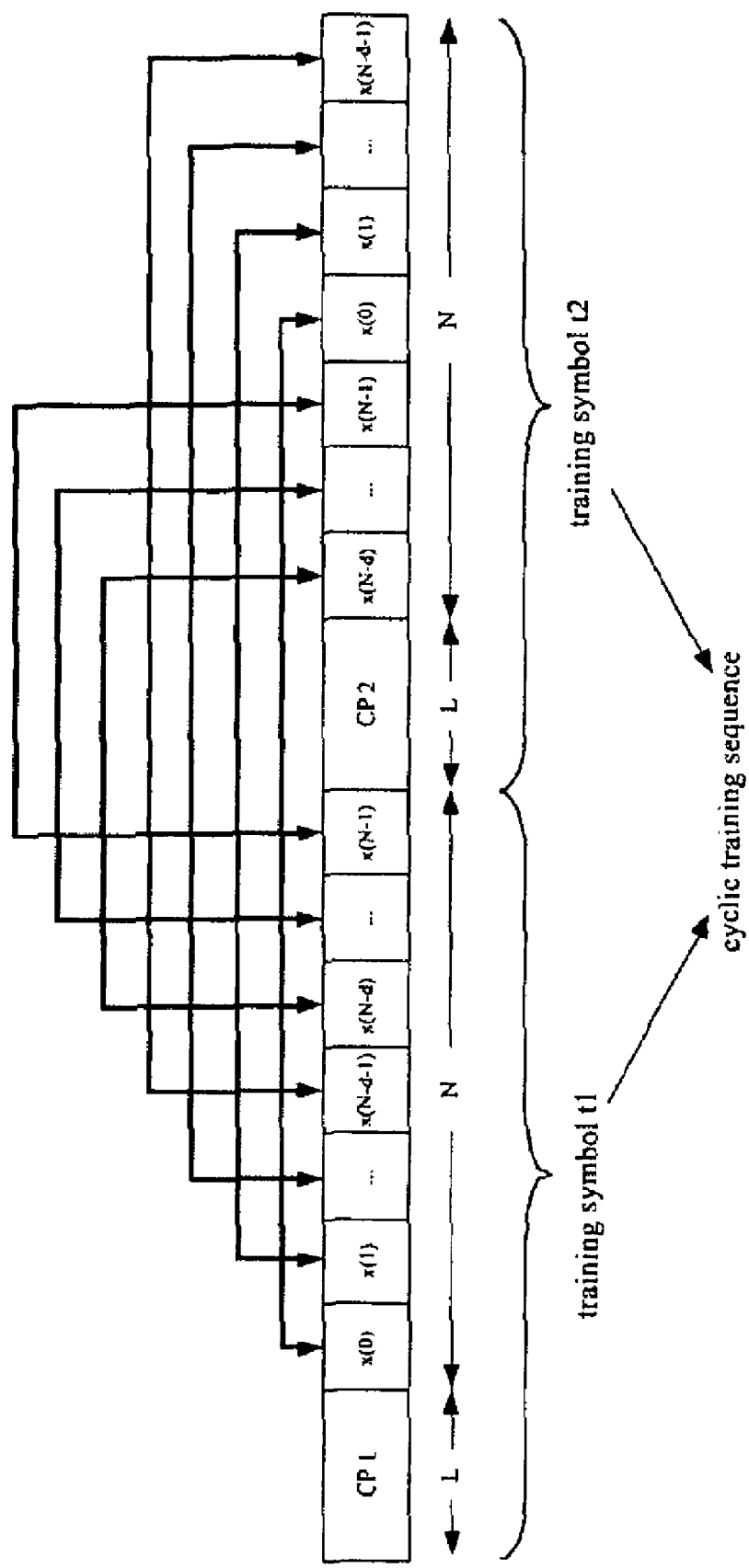
FIG. 1 shows a new cyclic training sequence S provided by the present invention.

Embodiments of the present invention solve the problem that the interference and distortion between training sequences of different users that may lead to the failure of uplink synchronization of some users and failure to obtain high precise downlink synchronization.

Embodiments of the present invention comprise a new cyclic training sequence group generating method, and a communication method using the cyclic training sequence group.

According to the first embodiment of the present invention, a method for generating a cyclic training sequence with a first training symbol and a second training symbol sequentially is provided, the first training symbol including a first CP and a first information block sequentially and the second training symbol including a second CP and a second information block sequentially, the method comprising: generating randomly the first information block with the length N, wherein N is a natural number; copying the last L samples of the first information block to the beginning of the block as the first CP, wherein L is a natural number less than N; generating the second information block with the length N by the first information block of the first training symbol in a circle manner in which the last d samples of the first information block are shifted to the position before the rest (N−d) samples and the N samples thus rearranged forms the second information block, wherein the corresponding relation between the first and second information blocks is the structure characteristic of the cyclic training sequence, and d is 0 or any natural number less than N; and copying the last L samples of the second information block to the beginning of the block as the second CP to form the integrated cyclic training sequence.

According to the second embodiment of the present invention, a communication method of the cyclic training sequence mentioned in the first embodiment, the communication method includes: a user sending the access request to the base station through the common control channel; after receiving the access request from the user, the base station searching for the unallocated training sequences in the cyclic training sequence resource table, which contains a plurality of cyclic training sequences with different structure characteristics; the base station selecting an unallocated cyclic training sequence from those retrieved, transmitting a response message to the terminal about the allocation of the cyclic training sequences, and refreshing the allocation states of the cyclic training sequences in the cyclic training sequence resource table of the base station, wherein the response message includes the specific structure characteristic of the cyclic training sequence; the terminal generating an integrated frame and transmitting it to the base station according to the specific structure characteristic of the cyclic training sequence in the response message, wherein the integrated frame includes data symbols and the cyclic training sequence specific to the terminal; and the receiving means of the base station performing timing synchronization and carrier frequency offset estimation for the transmitted signal and after demodulation and decoding, recovering the transmitted signal.

According to the third embodiment of the present invention, a communication method of the cyclic training sequence mentioned in the first embodiment, the communication method includes: a user sending the access request to the base station through the common control channel; after receiving the access request from the user, the base station searching for the unallocated training sequences in the cyclic training sequence resource table, which contains a plurality of cyclic training sequences with different structure characteristics; the base station selecting an unallocated cyclic training sequence from those retrieved, transmitting a response message to the terminal about the allocation of the cyclic training sequences, and refreshing the allocation states of the cyclic training sequences in the cyclic training sequence resource table of the base station, wherein the response message includes the specific structure characteristic of the cyclic training sequence; the terminal generating an integrated frame and transmitting it to the base station according to the specific structure characteristic of the cyclic training sequence in the response message, wherein the integrated frame includes data symbols and the cyclic training sequence specific to the terminal; and the receiving means of the base station performing timing synchronization and carrier frequency offset estimation for the transmitted signal, and after demodulation and decoding, recovering the transmitted signal.

Advantages of the present invention include that when the cyclic training sequence is used for downlink synchronization, the synchronization performance is better than that of the traditional training sequence, and the cyclic training sequence can realize high precise downlink synchronization; when the cyclic training sequence is used for uplink synchronization, the cyclic training sequence group can avoid the timing synchronization failure caused by the overlap of training sequences of different users; when at most (N−1) users access the same base station simultaneously, the cyclic training sequence group can reduce the interference and distortion between different users caused by the overlap of multi-user training sequence in order to guarantee that every user can have stable and reliable uplink synchronization.

Embodiments of the present invention aim to solve a problem of designing the training sequence in uplink/downlink synchronization in the multiuser system. In one embodiment, the present invention provides a group of highly efficient cyclic training sequence, which can realize precise downlink synchronization and can avoid the synchronization failure due to the overlap of the training sequences of different users and reduce the interference and distortion between different users due to the overlap of multi-user training sequences in uplink synchronization in order to guarantee that every user can have stable and reliable uplink synchronization.

Cyclic Training Sequence

FIG. 1 shows a new cyclic training sequence S provided by one embodiment of the present invention.

The new cyclic training sequence S includes 2 training symbols t1 and t2 with the same length, wherein both of the symbols include an information block and a CP. The length of the information block of t1 or t2 is N and that of CP is L and the length of t1 and t2 is N+L respectively, wherein in current specifications, N is any natural number such as 64, 128, 1024, etc. and L is any natural number less than N.

One embodiment of the cyclic training sequence S (including the first training symbol t1 and the second training symbol t2) of the present invention can be generated through the following steps:

step a): generating the information block of the first training symbol t1, i.e., the first information block of the training sequence, wherein the samples of the first information block can be generated randomly;

step b): copying the last L samples of the first information block to the beginning of the block as CP1 of the training symbol t1;

step c): generating a second information block by the first information block of the first training symbol t1 in a circular manner in which the last d samples of the first information block are shifted to the position before the rest (N−d) samples and the N samples thus rearranged forms the second information block, wherein the corresponding relation of the first and second information blocks is the structure characteristic of the cyclic training sequence S; and step d): copying the last L samples of the second information block to the beginning of the block as CP2 of the training symbol t2.

It can be seen from FIG. 1 that the information blocks of t1 and t2 generated through steps a) to d) are actually generated from the same data with a different sample order, e.g., the orders of the samples in the information blocks of t1 and t2 are different.

Next the Cycle Manner Will be Illustrated in Detail

Supposed the information block of the training symbol t1 includes sequentially N samples $\{x(0), x(1), \ldots, x(N-1)\}$, then the last L samples $\{x(N-L), x(N-L+1), \ldots, x(N-1)\}$ of the information block are copied to the beginning of the block as CP1 of the training symbol t1.

Then in step c), the information block of the training symbol t2 is designed as $\{x(N-d), x(N-d+1) \ldots x(N-1), x(0), x(1), \ldots, x(N-d-1)\}$, wherein $0 \leq d < (N-1)$ according to the information block of the training sequence t1, i.e., the last d samples of t1 are shifted to the position at the beginning of the first sample of the training symbol t1 and the rest samples are moved backward in succession to form the information block of the training symbol t2. Here for the purpose of illustration, the cyclic training sequence S generated by moving the last d samples is called the $d^{th}$ cyclic training sequence S, which has the $d^{th}$ structure characteristic.

Then in step d), the last L samples $\{x(N-d-L), x(N-d-L+1), \ldots, x(N-d-1)\}$ of the information block t2 are copied to the beginning of the block as CP2 of the training symbol t2. The training symbols t1 and t2 thus generated constitute the cyclic training sequence S of the present invention together and there are data correlations between the information blocks of t1 and t2.

The cyclic training sequence S for variant d is different. At the same time, since for the training sequence t1, d can be valued from (N−1) different numbers in theory, the training sequence t2 has (N−1) possible arrangements in structure and thus there may be (N−1) different cyclic training sequences.

Since the values of d for all the cyclic training sequences are different from each other, the interference between the cyclic training sequences allocated to each user by the base station is reduced and the sample correlations between the information blocks of t1 and t2 for each cyclic training sequence are different. Therefore, the interference between the cyclic training sequences at the base station is prevented preferably and the uplink/downlink synchronization of each user can be implemented better.

The Procedure of New User Access

The cyclic training sequences of all the users of the present invention are allocated unitedly by the base station accessed. The allocation of the cyclic training sequence for each user is accomplished when the user initially accesses the base station. Every base station stores a table, which is the training sequence resource (TSR) table. The training sequence resource table stores the ID of all the cyclic training sequences that can be allocated to the accessed users by the base station, the structure characteristic of the cyclic training sequence S (d) and the allocation status of each cyclic training sequence S (such as whether the S has been already allocated and to which user is it allocated, etc.). Table 1 shows the cyclic training sequence resource table according to one embodiment of the present invention.

TABLE 1

| ID of the cyclic training sequence | structure characteristic of the cyclic training sequence (d = ?) | whether the S being allocated | to whom the training sequence it is allocated |
|---|---|---|---|
| S0 | 0 | yes | user 1 |
| S1 | 1 | yes | user 2 |
| ... | ... | ... | ... |
| S(N − 1) | N − 1 | no | |

Figure 2:
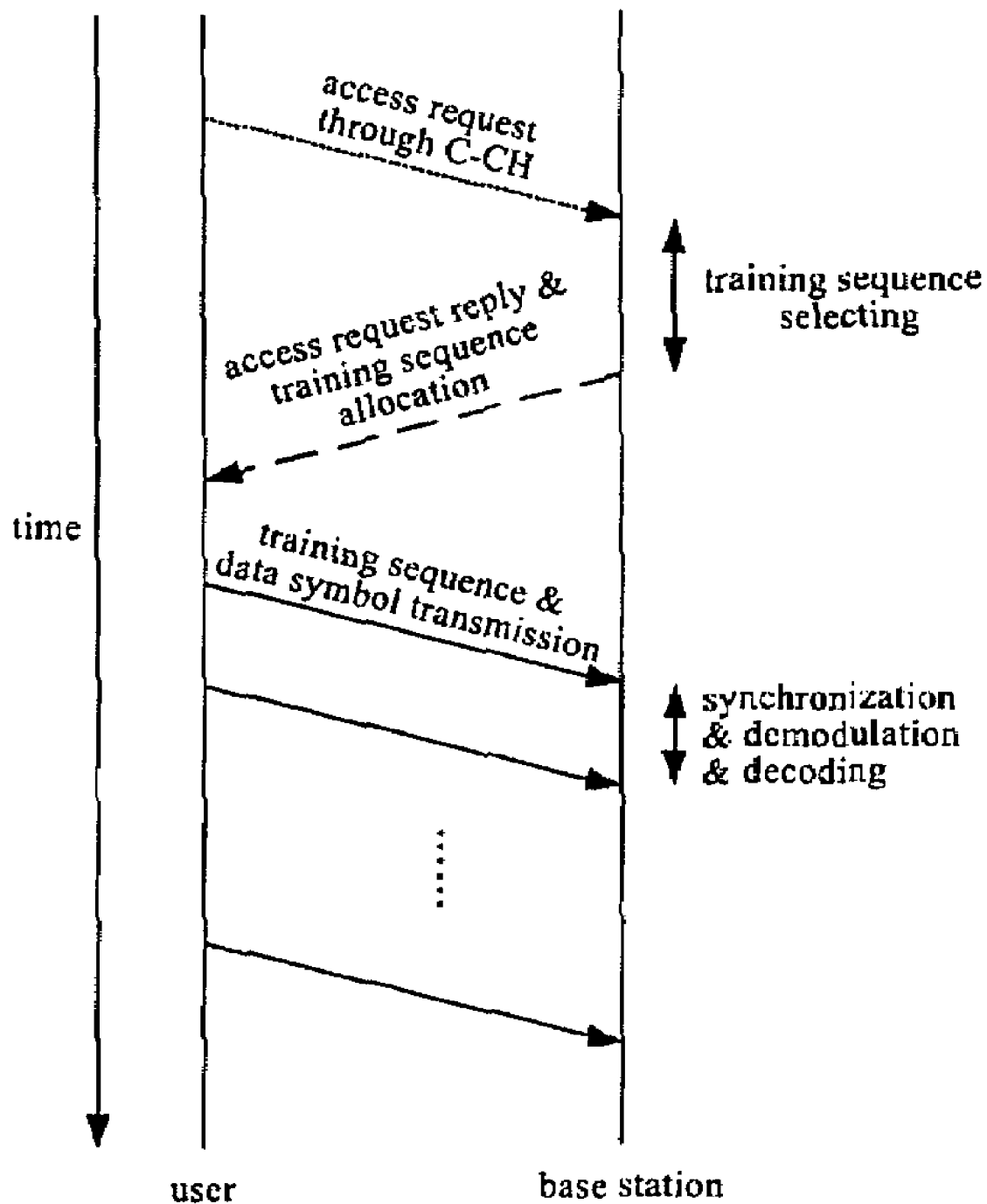
FIG. 2 is a schematic diagram showing that a new user accesses a base station according to one embodiment of the present invention.

FIG. 2 is a schematic diagram showing the communication procedure between a new user and the base station when the user accesses the base station. For a new user m accessing the base station, it doesn't have the specific cyclic training sequence S before accessing and the base station performs uplink/downlink synchronization according to the cyclic training sequence included originally in the signal transmitted by the user.

Next, the communication procedure between a new user m and the base station when the user accesses the base station will be illustrated in detail with reference to FIG. 2. The communication steps for accessing the base station by a user m are:

a) User m transmits an access request to the base station on the common control channel (C-CH);

b) After receiving the access request from the user, the base station searches the TSR table for the unallocated cyclic training sequences. The TSR table stores a plurality of cyclic training sequences of different structure characteristics (i.e. different d values);

c) The base station selects one from the unallocated cyclic training sequences and sends back a response message to the user m about the allocation status of the cyclic training sequences and the structure characteristic of the cyclic training sequences can be used by the user; in other words, the response message includes the specific structure characteristic of the cyclic training sequence S. At the same time, the base station refreshes the allocation status of the cyclic training sequences in the TSR table;

d) User m generates an integrated frame including the cyclic training sequence S specific to the user m and user data according to the specific structure characteristic of the cyclic training sequence S included in the response message. Then the integrated frame will be transmitted to the base station as the transmitting signal on the wireless channel.

e) The base station performs timing synchronization and carrier frequency offset estimation for the integrated frame transmitted by the user m, then demodulates and decodes it and recovers the transmitting signal of the user m.

In the above communication method according to the cyclic training sequence S of the present invention, because cyclic training sequences of different structure characteristic are provided to different users, in the uplink synchronization process of the full-multiplexing multiuser system, the base station can perform accurate uplink synchronization for each user and reduce the interference and distortion between different users caused by the overlap of multi-user training sequences, even there are overlaps between different training sequences.

Since there are (N−1) cyclic training sequences of the present invention, one base station can be accessed by (N−1) users at the same time, which can meet the full-multiplexing and multiuser system capacity. And the cyclic training sequences of the present invention can realize high precise downlink synchronization because of its structure characteristic.

Generally, the number of users a base station can support is far larger than that of the users actually accessed. Even if the number of users exceeds that the base station can support, the present invention can implement scheduling for a user accessing by the following way.

In the above step b, when the TSR table doesn't have any cyclic training sequence that can be allocated to the newly accessing user m (all the cyclic training sequences of the base station have been already allocated), the base station can find a cyclic training sequence S in the TSR table that has already been allocated to a (some) user and allocates it to the newly accessing user. Then the users with the same cyclic training sequence S will be scheduled in the time domain in order to guarantee the same training sequence S from these users will not overlap at the base station.

Communication System

Figure 3:
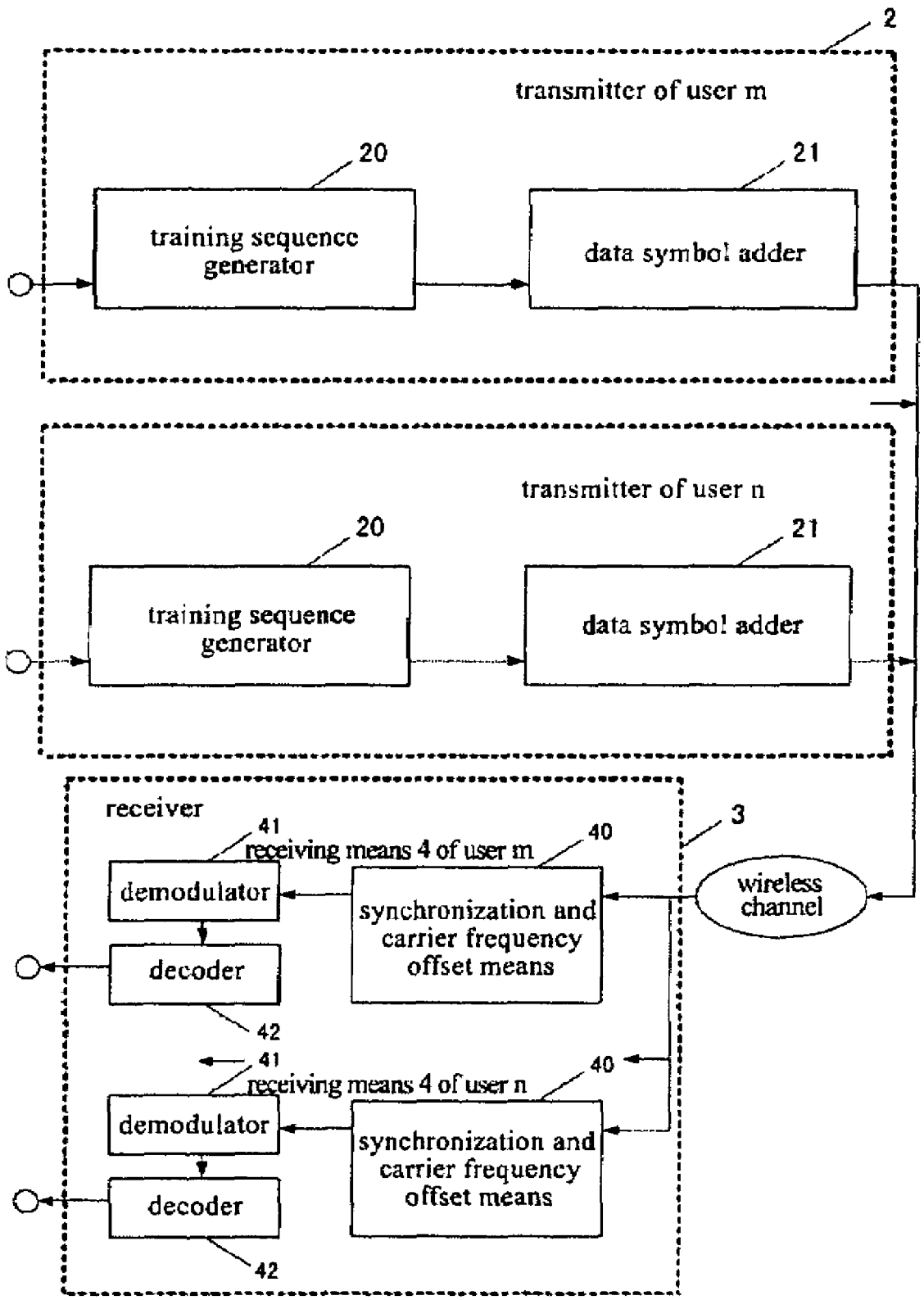
FIG. 3 is an architecture diagram of the communication system 1 according to one embodiment of the present invention.

FIG. 3 is an architecture diagram of the communication system 1 according to one embodiment of the present invention when the new user accesses the base station. Then the communication system 1 will be illustrated with reference to FIG. 3.

As shown in FIG. 3, the communication system 1 has a plurality of users and one base station, wherein each user has a transmitter 2 for transmitting the transmitting information. The base station has a receiver 3, which has a plurality of receiving means 4. Each receiving means 4 communicates with the transmitter 2 corresponding to the accessing user. The transmitter 2 of the user and the receiver 3 of the base station communicates in the way described in FIG. 2.

When different users access the base station, each of them will be allocated a cyclic training sequence S different in structure characteristic and designated a specific receiving means 4. For example, the $n^{th}$ cyclic training sequence is specific to user n and the $m^{th}$ cyclic training sequence is specific to user m.

Then, user m will be taken as an example to illustrate the communication procedure between the user and the base station.

Firstly, the transmitter 2 of user m transmits an access request to the base station on the common control channel. After receiving the access request of the user, the base station searches the TSR table, selects an unallocated cyclic training sequence and transmits a response message that includes the $m^{th}$ cyclic training sequence S of the user to the user m, and at the same time, the base station designates the specific receiving means 4 for receiving the transmitting signal of the user m.

The transmitter 2 of user m generates an integrated frame including the $m^{th}$ cyclic training sequence S and the user data according to the $m^{th}$ cyclic training sequence S allocated by the base station and transmits the integrated frame to the base station as the transmitting signal. The specific receiving means 4 of user m performs timing synchronization and carrier frequency offset estimation for the signal transmitted by user m according to the $m^{th}$ cyclic training sequence S allocated to user m, and demodulates and decodes the integrated frame to recover user m's data.

The base station performs the same operation for every accessing user as that for the above user m, wherein the cyclic training sequence S and the specific receiving means 4 of different users are different. The communication system 1 can reduce the interference and distortion because of the overlap of multi-user training sequences in the uplink synchronization in the multiuser system. And the high precise downlink synchronization can be realized according to the structure characteristic of the cyclic training sequence S of one embodiment of the present invention.

Transmitter 2

Figure 4:
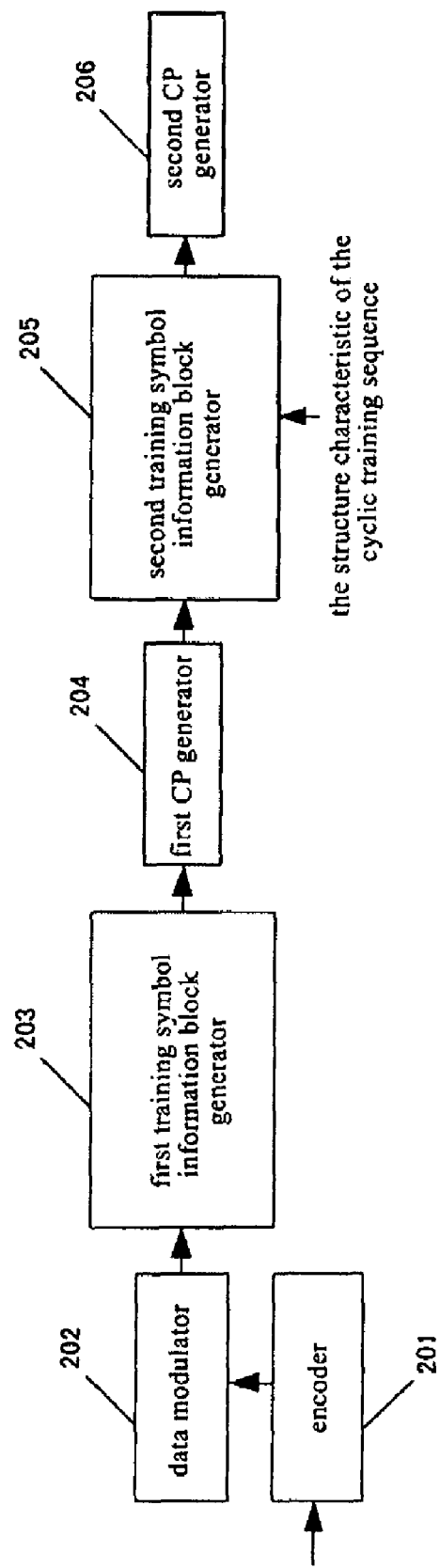
FIG. 4 is an architecture diagram of the transmitter 2 of user m according to one embodiment of the present invention.

FIG. 4 is an architecture diagram of the transmitter 2 of user m, wherein user m receives a response message from the base station including the structure characteristic of the allocated cyclic training sequence.

The transmitter 2 includes a training sequence generator 20 and a data symbol adder 21. The training sequence generator 20 generates the specific cyclic training sequence according to the structure characteristic of the allocated cyclic training sequence, and the data symbol adder 21 adds data symbols and forms an integrated frame of the user based on the specific cyclic training sequence generated by the training sequence generator 20.

Specifically, the training sequence generator 20 includes an encoder 201, a data modulator 202, a first training symbol information block generator 203, a first CP generator 204, a second training symbol information block generator 205 and a second CP generator 206.

After receiving the response message from the base station, the transmitter 2 randomly encodes data with encoder 201 in the training sequence generator 20. The data modulator 202 modulates the outputted code from the encoder 201 and inputs the modulated coded data to the first training symbol information block generator 203 for generating the cyclic training sequence.

The first training symbol information block generator 203 generates the first information block (with the length N) of the first training symbol of the cyclic training sequence S of user m.

The first CP generator 204 copies the last L samples of the first information block to the beginning of the block as CP1 and thus forms the first training symbol according to the first information block of the first training symbol generated by the first training symbol information block generator 203.

The second training symbol information block generator 205 shifts the last d samples of the first information block to the position before the rest (N−d) samples according to the structure characteristic of the cyclic training sequence of user m in the response message, and the rearranged N samples form the information block of the second training (symbol, i.e. the second information block of the cyclic training sequence.

The second CP generator 206 copies the last L samples of the second information block to the beginning of the block as CP2 and forms the second training symbol according to the second information block of the second training symbol generated by the second training symbol information block generator 205.

Thus, the training sequence generator 20 forms the cyclic training sequence S of one embodiment of the present invention, which includes sequentially the first training symbol with a CP and an information block and the second training symbol with a CP and an information block.

The data symbol adder 21 adds some data symbols, i.e. user data, to the end of the cyclic training sequence generated by the training sequence generator 20, and forms an integrated frame. Then user m transmits the integrated frame as the transmitting signal to the base station on the wireless channel.

Receiver 3

Figure 5:
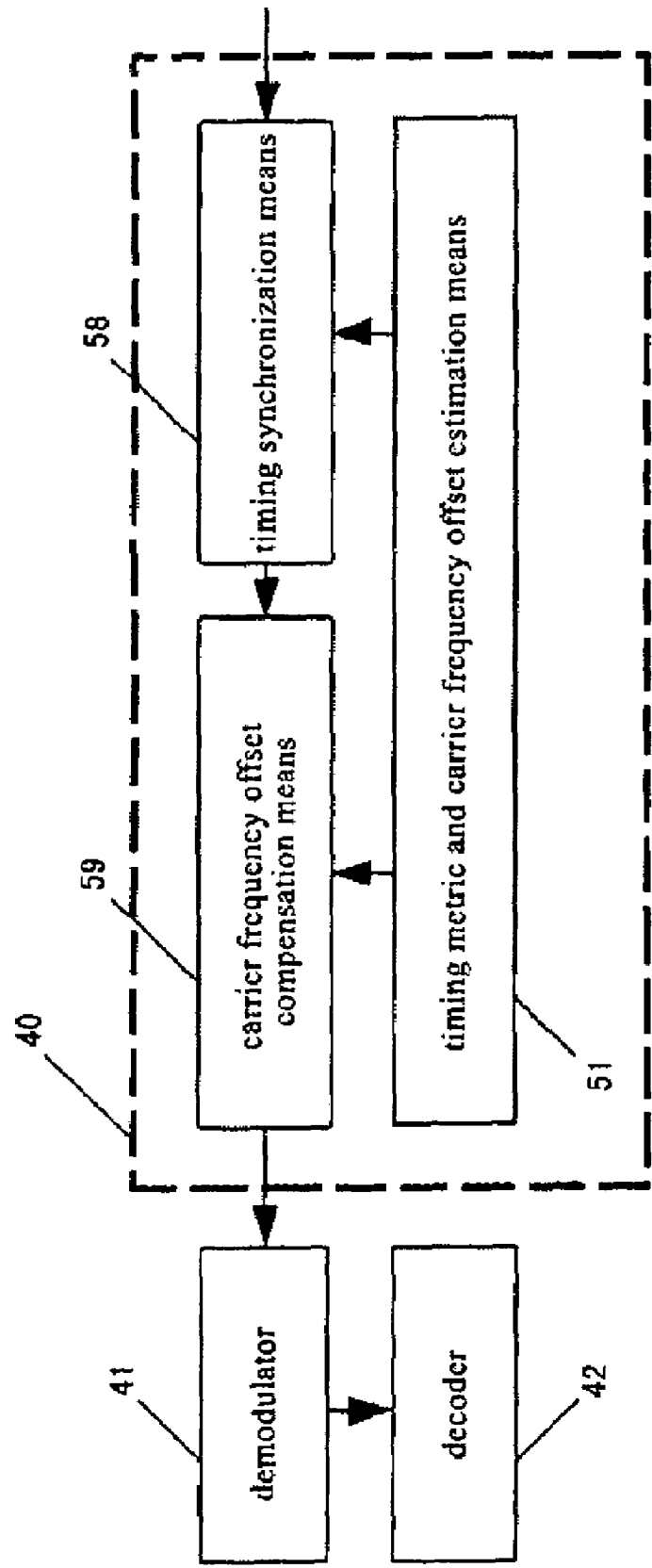
FIG. 5 is an architecture diagram of the receiver 3 of the base station providing cyclic training sequence S according to one embodiment of the present invention.

FIG. 5 is an architecture diagram of the receiver 3 of the base station providing cyclic training sequence S according to one embodiment of the present invention.

In the multiuser system, when different users adopt full-multiplexing transmission, different users may transmit their own integrated frames simultaneously. At the base station, signals from different users overlap each other. The receiver 3 according to one embodiment of the present invention performs timing synchronization and carrier frequency offset estimation for each user. As for the uplink synchronization of the full-multiplexing multiuser system, the receivers 3 can accomplish the timing synchronization of different users in parallel.

As shown in FIG. 5, the receiver 3 has a plurality of receiving, means 4, and the architecture and operation of each receiving means 4 is the same. Here the receiving means 4 of user m will be illustrated as an example.

When user m requests to access the base station, the structure characteristic of the cyclic training sequence S allocated to user m is that the second training symbol of the cyclic training sequence S is formed by shifting the last d samples of the information block of the first training symbol. Generally, the value of d is different to those of the cyclic training sequences allocated to other users. For the purpose of simplification, the cyclic training sequence allocated to user m is called the $m^{th}$ cyclic training sequence.

FIG. 5 shows the receiving means 4 for user m includes a synchronization and frequency offset means 40, a demodulator 41 and a decoder 42.

The receiving means 4 of user m utilizes the synchronization and frequency offset means 40 to perform timing synchronization and carrier frequency offset estimation according to the signal from user m on the wireless channel. Then the demodulator 41 and the decoder 42 are used to demodulate and decode the signal and the signal from user m can be recovered in the receiving means 4 specific to user m.

At the receiving means 4, signals (integrated frames) from different users are overlapped so a group of data sequence r(k) received by the receiving means 4 are overlapped by different user training symbols and data symbols.

The synchronization and frequency offset means 40 includes a timing metric and carrier frequency offset estimation means 51, a timing synchronization means 58 and a carrier frequency offset compensation means 59.

The timing metric and carrier frequency offset estimation means (51) finds the beginning position of the cyclic training sequence S of user m from the received data sequence r(k) according to the $m^{th}$ cyclic training sequence allocated to user m and the data sequence r(k) inputted to the timing synchronization means 58. The timing metric specific to user m is utilized to search the received overlap data sequence r(k) sample by sample and to find the beginning position of the cyclic training sequence. When the timing metric has the largest local peak, i.e., when the structure characteristic of the $m^{th}$ cyclic training sequence matches that of a segment of data in the received data sequence r(k), the receiving means 4 defines the beginning position with the largest local peak as the beginning of the cyclic training sequence S of the user m and the timing synchronization means can realize timing synchronization.

After the synchronization is finished, i.e. after the $m^{th}$ cyclic training sequence S of user m is detected in the data sequence r(k), the receiving means 4 will perform carrier frequency offset estimation for user m with the detected training sequence S.

The timing metric and carrier frequency offset estimation means 51 specific to user m, i.e. specific to the $m^{th}$ cyclic training sequence S obtains the carrier frequency offset of the user m relative to the receiving means 4 according to the received data sequence r(k) after being synchronized, and inputs it into the carrier frequency offset compensation means 59. The carrier frequency offset compensation means 59 compensates for the user m according to the r(k) from the timing synchronization means 58 and the carrier frequency offset of user m from the timing metric and carrier frequency offset estimation means 51. Then the compensated data sequence r(k) is transmitted to the demodulator 41 and decoder 42 to recover the signal from user m.

Timing Metric and Carrier Frequency Offset Estimation Means

Figure 6:
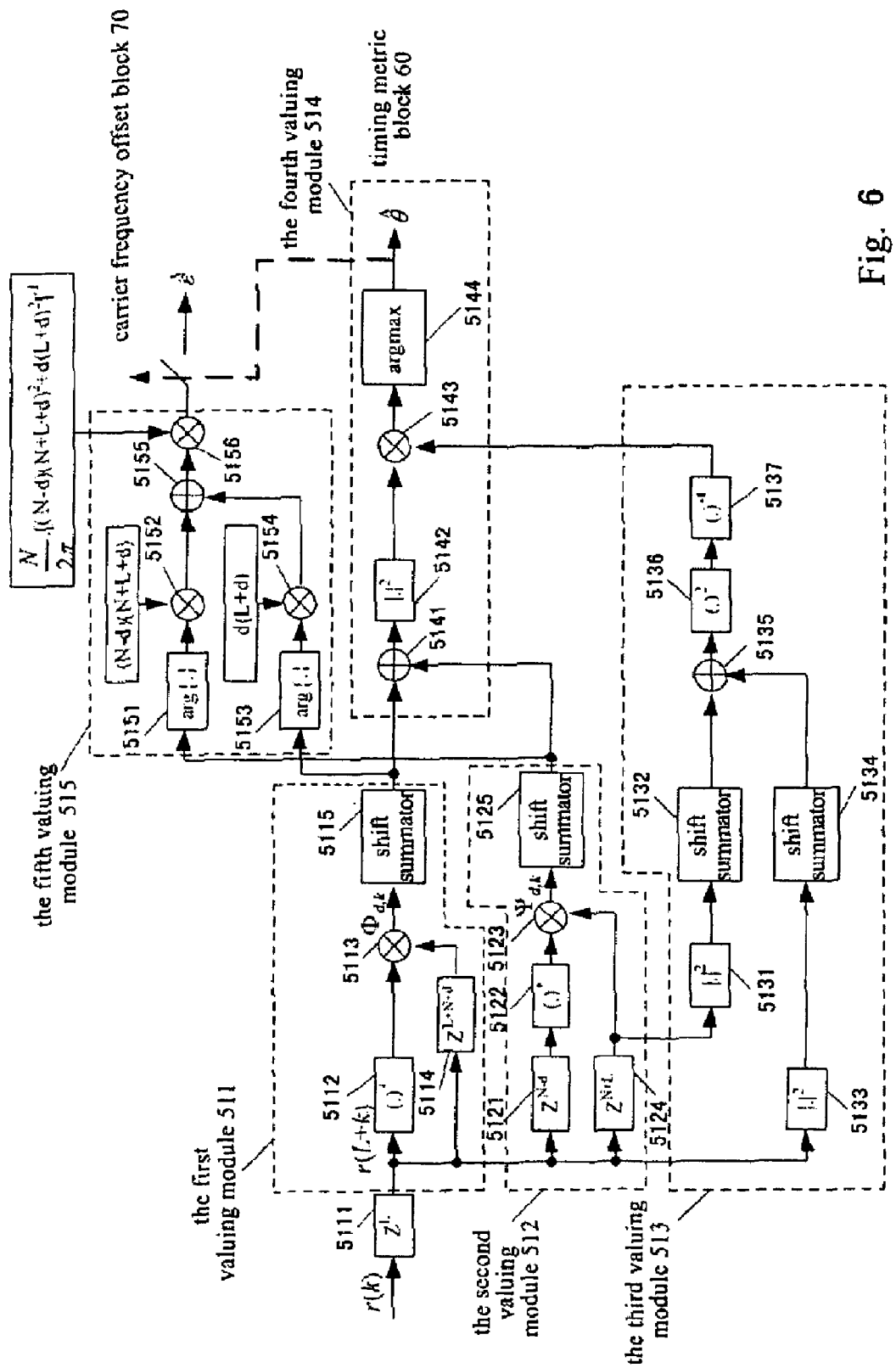
FIG. 6 is an architecture diagram of the timing metric and carrier frequency offset estimation means 51 according to one embodiment of the present invention.

FIG. 6 is an architecture diagram of the timing metric and carrier frequency offset estimation means 51 according to one embodiment of the present invention. The process of searching the largest local peak of the timing metric will be described first, which is the timing synchronization process of the inputted signals.

As shown in FIG. 6, the timing metric and carrier frequency offset estimation means 51 includes a shift register 5111, a first valuing module 511, a second valuing module 512, a third valuing module 513 and a fourth valuing module 514, wherein the shift register 5111, the first, second, third, fourth valuation modules 511, 512, 513, 514 constitute the timing metric block 60, the shift register 5111, the first, second, fifth valuation module 511, 512, 515 constitute the carrier frequency offset block 70. The operation process is: the timing metric block 60 shifts the received data sequence r(k) and obtains the shifted data sequence r(L+k) according to the r(k) inputted to the timing synchronization means 58. The first, second and third valuation modules 511, 512 and 513 are used to process the data sequence r(L+k) and obtains the first, second and third valuation results. Then the fourth valuing module decides the largest local peak of the timing metric according to the first, second and third valuing results. When there is a largest local peak, i.e. the cyclic training sequence S specific to user m is detected, the timing synchronization of the data sequence is realized.

Then, the carrier frequency offset block 70 makes use of the fifth valuation module 515 to obtain the estimated carrier frequency offset of user m at the base station according to the detected cyclic training sequence S and the first and second valuation results. The timing metric block 60 and the carrier frequency offset block 70 share the first and second valuation modules.

The operation process of the timing metric block 60 will be described first. Suppose the cyclic training sequence S specific to user m has the $m^{th}$ structure characteristic.

Timing Metric Block

Suppose the data sequence r(k) received by the base station is $\{r(0), r(1), \ldots, r(N-1)\}$. The shift register 5111 implements $Z^L$ shift on the r(k) inputted ($Z^L$ means an L bit delay) and obtains the data r(L+k) after shift. Then the data r(L+k) is inputted to the first, second and third valuation modules 511, 512 and 513 respectively, wherein L is the length of CP of the $m^{th}$ cyclic training sequence.

The first valuation module 511 includes a conjugator 5112, a multiplier 5113, a shift register 5114 and a shift summator 5115.

The conjugator 5112 gets the conjugation of the data r(L+k) from the shift register 5111 and inputs it to the multiplier 5113. At the same time, the shift register 5114 implements $Z^{L+N+d}$ shift on the r(L+k), obtains the data r(L+k+L+N+d) and inputs it to the multiplier 5113. The multiplier 5113 multiplies the data from the conjugator 5112 and the shift register 5114 respectively, obtains the multiplication results $\Phi_{d,k}, \Phi_{d,k+1}, \ldots, \Phi_{d,k+N-1-d}$ sequentially according to the correlation modes between the two information blocks of the $m^{th}$ cyclic training sequence and inputs them to the shift summator 5115, and the shift summator 5115 adds the N−d multiplication results from the multiplier 5113 all together and obtains the first valuation result $$\sum_{z=k}^{k+d-1} \Psi_{d,z}.$$

The second valuation module 512 includes a shift register 5121, a conjugator 5122, a multiplier 5123, a shift register 5124 and a shift summator 5125.

The shift register 5121 implements $Z^{N-d}$ shift on the data r(L+k) from the shift register 5111 and inputs it into the conjugator 5122, and the conjugator 5122 obtains the conjugation of the data from the shift register 5121 and inputs it to the multiplier 5123. At the same time, the shift register 5124 implements $Z^{N+L}$ shift on the data r(L+k) from the shift register 5111, obtains the data r(L+k+N+L) and inputs it to the multiplier 5123. The multiplier 5123 multiplies the data from the conjugator 5122 and the shift register 5124 respectively, obtains the multiplication results $\Psi_{d,k}, \Psi_{d,k+1}, \ldots, \Psi_{d,k+d-1}$ sequentially according to the correlation modes between the two information blocks of the $m^{th}$ cyclic training sequence and inputs them to the shift summator 5125. Then the shift summator 5125 adds the d multiplication results from the multiplier 5123 all together and obtains the second valuation result $$\sum_{z=k}^{k+d-1} \Psi_{d,z}.$$

The third valuation module 513 includes module and square computing units 5131 and 5133, shift summators 5132 and 5134, an adder 5135, a square computing unit 5136 and a reciprocal computing unit 5137.

The module and square computing unit 5131 obtains the module and square results of the data sequences r(N+2L+k), r(N+2L+k+1), ..., r(2N+2L+k−1) from the shift register 5124 in the second valuation module 512 respectively. The results are inputted to the shift summator 5132 and the value $$\sum_{z=N+L+k}^{2N+L+k-1} |r(L+z)|^2$$

is obtained. The module and square computing unit 5133 obtains the module and square results of the data sequences r(L+k) r(L+k+1), ..., r(N+L+k−1) from the shift register 5111, then the N square values are inputted to the shift summator 5134 and the value $$\sum_{z=k}^{N+k-1} |r(L+z)|^2$$

is obtained. The adder 5135 adds the value $$\sum_{z=k}^{N+k-1} |r(L+z)|^2$$

from the shift summator 5134 to the value $$\sum_{z=N+L+k}^{2N+L+k-1} |r(L+z)|^2$$

from the shift summator 5132 and outputs the result to the square computing unit 5136, which gets the square of the result from the adder 5135 and outputs the square result to the reciprocal computing unit 5137, which gets the reciprocal of the square result as the third valuation result.

The fourth valuation module 514 includes an adder 5141, a module and square computing unit 5142, a multiplier 5134 and an angle computing unit 5144.

The adder 5141 adds the first valuation result $$\sum_{z=k}^{N+k-1-d} \Phi_{d,z}$$

from the first valuation module 511 to the second valuation result $$\sum_{z=k}^{k+d-1} \Psi_{d,z}$$

from the second valuation module 512 and outputs the result to the module and square computing unit 5142, which performs moduling and square computation for the result. The multiplier 5143 multiplies the square result from the module and square computing unit 5142 by the third valuation result from the third valuation module. Then the multiplication result is outputted to the maximum compound angle computing unit 5144, and the unit 5144 acquires the maximum compound angle result, i.e. the timing metric block 60 searched the largest local peak sample by sample. When the largest local peak appears, the timing synchronization is realized.

From the above, the timing metric block 60 specific to user m searches for the beginning position of the $m^{th}$ cyclic training sequence to realize timing synchronization by the shift register 5111 and the first, second, third and fourth valuation modules 511, 512, 513 and 514, i.e. the timing metric block 60 utilizes the timing metric $M_d(\theta)$ of the $m^{th}$ cyclic training sequence specific to user m.

$$M_d(\theta) = \frac{\left|\sum_{z=\theta}^{N+\theta-1-d}\Phi_{d,z} + \sum_{k=\theta}^{d+\theta-1}\Psi_{d,k}\right|^2}{\left[\sum_{p=\theta}^{N+\theta-1}\left(|r(p+L)|^2 + |r(N+p+2L)|^2\right)\right]^2} \quad (1)$$

wherein $\Phi_{d,z} = r^*(L+z)r(N+2L+d+z)$, $\Psi_{d,k} = r^*(N+L-d+k)r(N+2L+k)_o$ $\theta$ in formula (1) is an index and the index of the first sample is 0.

Carrier Frequency Offset Block

After timing synchronization, the carrier frequency offset block 70 specific to the $m^{th}$ cyclic training sequence S of user m performs carrier frequency offset estimation with the detected $m^{th}$ cyclic training sequence S, the shift register 5111, the first, second and fifth valuation modules 511, 512 and 515 according to the beginning position of the $m^{th}$ cyclic training sequence obtained by the timing metric block 60. The carrier frequency offset block 70 and the timing metric block 60 share the first and second valuation modules 511 and 512.

The fifth valuation module 515 includes angle computing units 5151 and 5152, multipliers 5152 and 5156 and an adder 5155.

The angle computing unit 5151 gets the compound angle of the second valuation result from the second valuation module 512 and inputs the compound angle to the multiplier 5152, which multiplies the compound angle with (N−d)(N+L+d) and gets the multiplication result $$(N-d)(N+L+d)\arg\left\{\sum_{z=0}^{N-1-d}\Phi_{d,z}\right\}.$$

The angle computing unit 5153 gets the compound angle of the first valuation result from the first valuation module 511 and inputs the compound angle to the multiplier 5154, which multiplies the compound angle with d(L+d) and gets the multiplication result $$d(L+d)\arg\left\{\sum_{k=0}^{d-1}\Psi_{d,k}\right\}.$$

The adder 5155 adds the results from the multipliers 5152 and 5154 together and inputs the adding result to the multiplier 5156. Then the multiplier 5156 multiplies the adding result by $$\frac{N}{2\pi[(N-d)(N+L+d)^2 + d(L+d)^2]}$$

and gets the estimated carrier frequency offset result:

$$\hat{\varepsilon}_d = \frac{N}{2\pi} \cdot \frac{(N-d)(N+L+d)\arg\left\{\sum_{z=0}^{N-1-d}\Phi_{d,z}\right\} + d(L+d)\arg\left\{\sum_{k=0}^{d-1}\Psi_{d,k}\right\}}{(N-d)(N+L+d)^2 + d(L+d)^2} \quad (2)$$

$$\arg\left\{\sum_{z=0}^{N-1-d}\Phi_{d,z}\right\} \text{ and } \arg\left\{\sum_{k=0}^{d-1}\Psi_{d,k}\right\}$$

in formula (2) mean to get the compound angles of $$\sum_{z=0}^{N-1-d}\Phi_{d,z} \text{ and } \sum_{k=0}^{d-1}\Psi_{d,k}$$

respectively.

The carrier frequency offset block 70 is the estimator specific to the $d^{th}$ cyclic training sequence S of user m. The estimator is conditionally unbiased and the CRLB in high SNR environment is:

$$\text{Var}\{\hat{\varepsilon}_d\} = \frac{N}{4\pi^2(N^2 + L^2 - d^2 + 2NL + Nd)SNR} \quad (3)$$

After the estimation of the carrier frequency offset, the carrier frequency offset of the user m relative to the base station can be compensated at the carrier frequency offset compensation means 59 through formula (3). After demodulation and decoding, the transmitted signal can be recovered.

Figure 7:
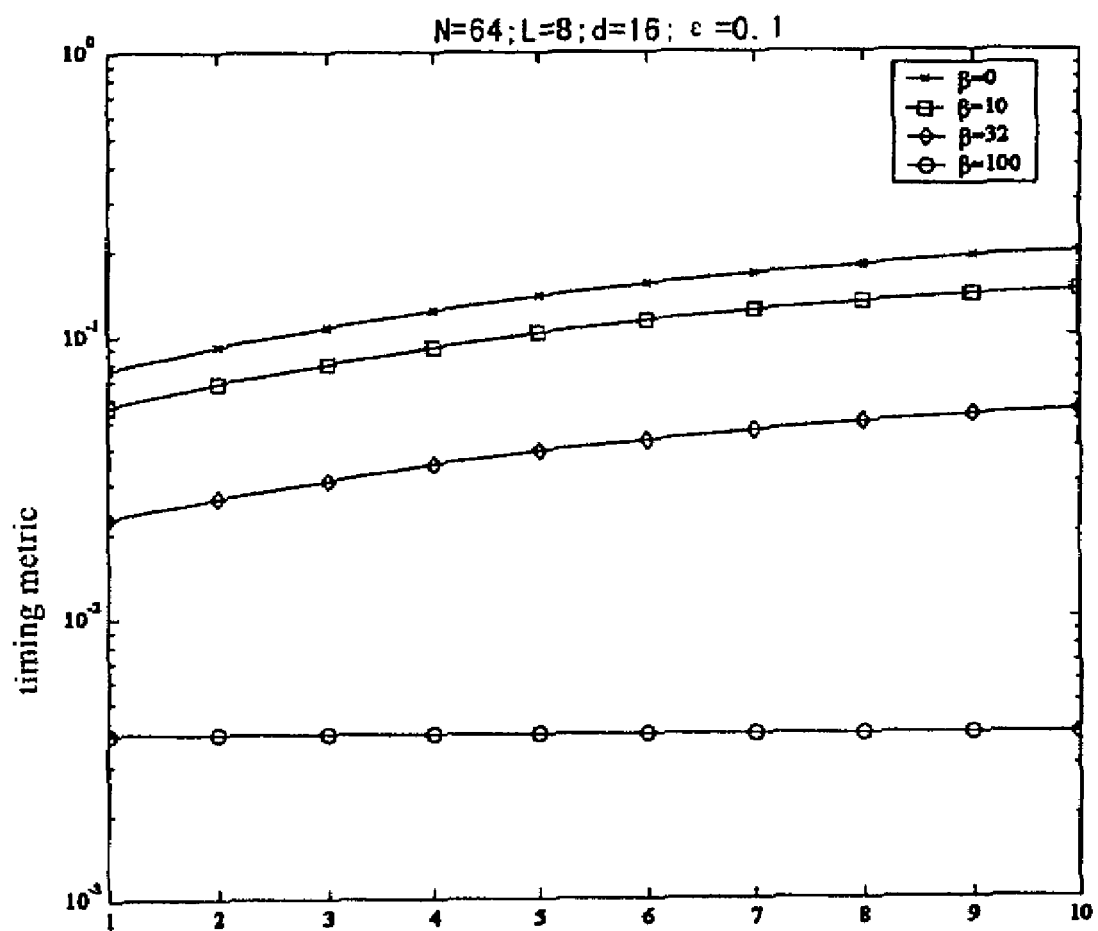
FIG. 7 is a schematic diagram showing the performance comparison of one embodiment of the cyclic training sequence group algorithm provided by the present invention with Moose algorithm when adopted in uplink carrier frequency offset estimation.

FIG. 7 is a schematic diagram showing the performance comparison of the cyclic training sequence group algorithm provided by the present invention with the Moose algorithm when adopted in uplink carrier frequency offset estimation.

Different from downlink synchronization, in the uplink synchronization in the multiuser system, if a plurality of users adopt full-multiplexing transmission, the training sequences of different users may overlap at the base station. The overlap not only reduces the effective signal interference noise ratio (SINR) of a single user more severely, but also may lead to the failure of the synchronization performance of some training sequences and thus the failure of the synchronization of the user.

In the simulation example shown in FIG. 7, suppose two users are in uplink transmission simultaneously, wherein the carrier frequency offset of user 1 is 0.1 and that of user 2 is 0.2. The signal of user 2 is regarded as the noise for user 1 in the simulation example and only user 1's performance is simulated.

When the Moose algorithm is applied to the two users, if the transmission delays of the two users differ by 288 data samples, i.e. the training sequences of the two users don't overlap at the base station, every user can be accurately synchronized. Since the data of one user can be considered as the noise to another user, the increase of SINR of each user tends to be gentle with the increase of SNR and in high SNR environment, the performance of the algorithm presents Floor Effect. If the transmission delays of the two users differ by 64 data samples, i.e. the training sequences of the two users overlap partly at the base station, the Moose algorithm will be invalid and the result is that the estimated error of the carrier frequency offset is very large and the estimated error does not drop with the increase of the SNR.

When the algorithm of the cyclic training sequence S provided by the present invention is applied to uplink synchronization, its performance is very stable. In the simulation example, the cyclic training sequence with d=64 is allocated to user 1 and that with d=16 is allocated to user 2. FIG. 7 shows its estimation accuracy is apparently higher than that of the Moose algorithm, and the uplink synchronization performance of the cyclic training sequence S of the present invention is free from the influence of the transmitting delay. In other words, although the training sequences of the two users overlap, the synchronization performance of each training sequence is maintained and accurate synchronization can be realized.

As illustrated above, in the multiuser system, when different users adopt full-multiplexing transmission and transmit their own signals simultaneously, in the case that their training sequences overlap at the base station, the timing metric $M_d(\theta)$ and the carrier frequency offset estimator $\epsilon_d^\wedge$ (timing metric block 60 and carrier frequency offset block 70) specific to the $m^{th}$ cyclic training sequence of user m can perform timing synchronization and carrier frequency offset estimation for user m at the base station so that the interference and distortion between different users due to the overlap of multi-user training sequences in uplink synchronization is reduced and that every user can have stable and reliable uplink synchronization is guaranteed.

Downlink

The normal form of the current training sequence is {CP1, x(0), x(1), . . . , x(N−1), CP2, x(0), x(1), . . . , x(N−1)}. Suppose the distance between the correlation group of sample x(0), i.e. the distance between x(0) and x(0) is L, the sum of the squares of the distance of the correlation groups of all the samples is $NL^2$ (all together N samples correlation groups).

The cyclic training sequence S of one embodiment of the present invention according to the above circular mode has the form of {CP1, x(0), x(1), . . . , x(N−1), CP2, x(N−d), x(N−d+1), . . . , x(N−1), x(0), x(1), . . . , x(N−d−1)}, wherein the distance between the correlation group of sample x(0) is (L+d), the sum of the squares of the distance of the correlation groups of all the samples is $(N-d)(L+d)^2+d(L-d)^2$ and the mathematic deduction shows, $$NL^2 < (N-d)(L+d)^2 + d(L-d)^2 \quad (4)$$

When the cyclic training sequence S is applied to downlink synchronization, the precision is proportional to the sum of the squares of the distance of the correlation groups. It can be seen from Formula (4) that since the sum of the cyclic training sequence S of the present invention is greater than that of the normal training sequence, the training sequence S can realize high precise downlink synchronization.

Figure 8:
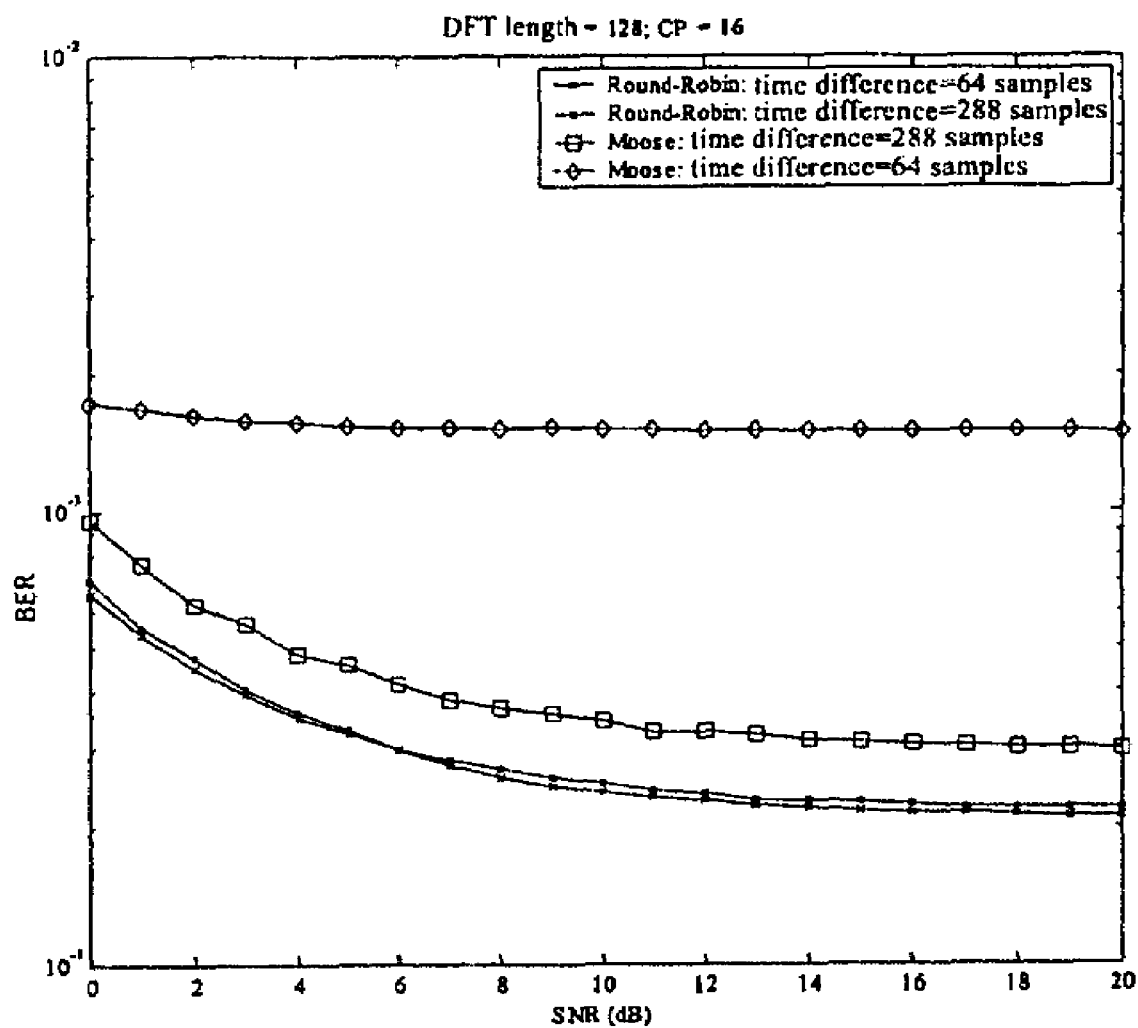
FIG. 8 is a schematic diagram showing that the specific timing metric of one embodiment of the cyclic training sequence S of the present invention changes with SINR and synchronization error.

FIG. 8 is a schematic diagram showing the specific timing metric of the cyclic training sequence S of the present invention changes with the SINR and synchronization error. As shown in FIG. 8, for the given timing offset β, the timing metric value tends to increase with the increase of SINR. For a given SINR, the less the timing offset is, the larger the timing metric value is. The performance makes it possible that the cyclic training sequence and the timing metric of the present invention can realize high precise timing synchronization.

Figure 9:
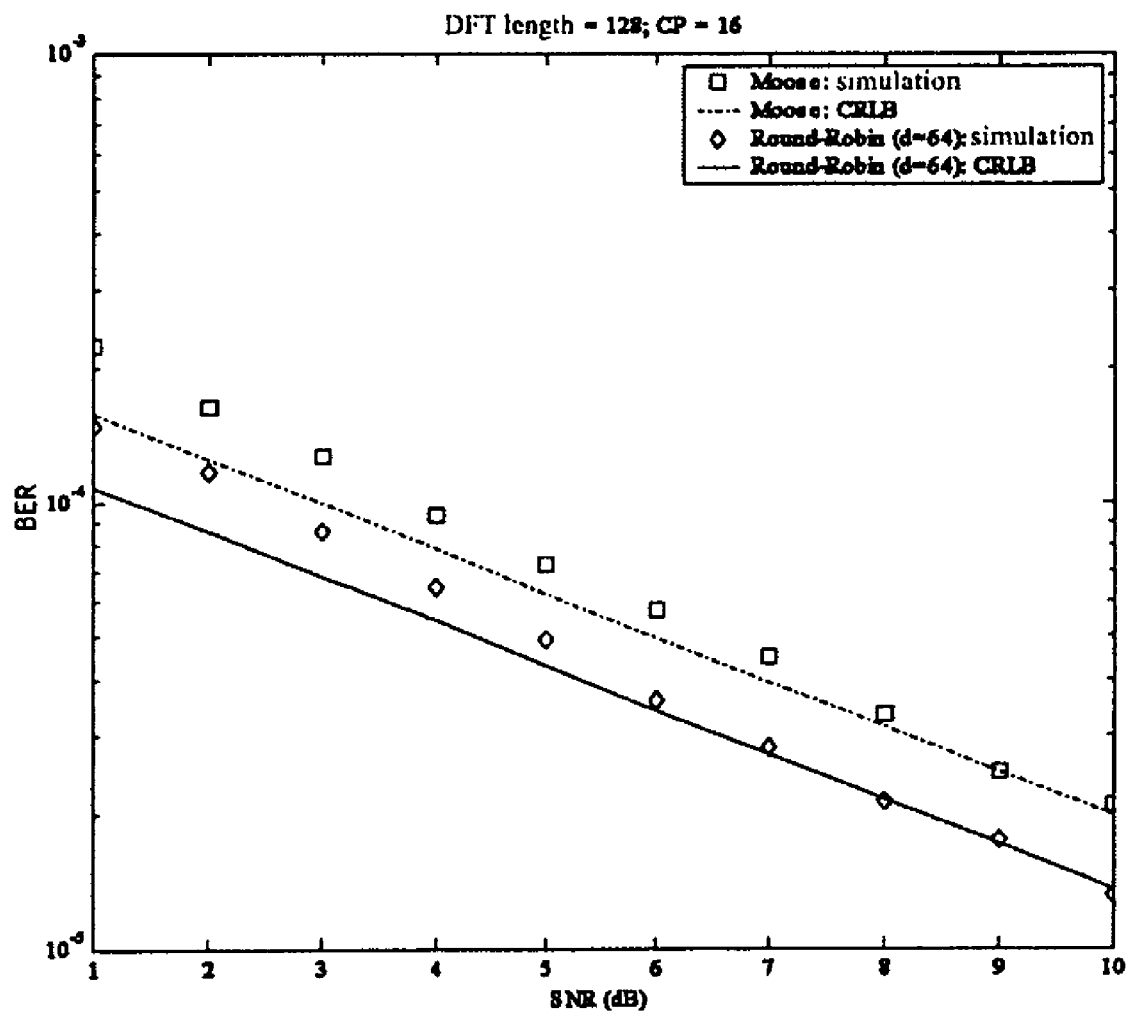
FIG. 9 is a schematic diagram showing the performance comparison of a cyclic training sequence group algorithm provided by the present invention with Moose algorithm when adopted in downlink carrier frequency offset estimation.

FIG. 9 is a schematic diagram showing the performance comparison of the cyclic training sequence group algorithm provided by the present invention with the Moose algorithm when adopted in downlink carrier frequency offset estimation. The DFT length of the two algorithms is set to 128 and CP is set to 16. In the simulation shown in FIG. 9, the parameter d is set to 64. It can be seen from FIG. 9 that the precision of the present invention is higher than that of the Moose algorithm. In high SNR environment, the performance of the present algorithm is 1.6 dB better than that of the Moose algorithm.

The cyclic training sequence S and communication system 1 can realize precise downlink synchronization, and in uplink synchronization can reduce the interference and distortion between different users due to the overlap of multi-user training sequence so in order to guarantee that every user can have stable and reliable uplink synchronization.

What is claimed is:

1. A method for generating a cyclic training sequence with a first training symbol and a second training symbol sequentially, the first training symbol including a first CP and a first information block sequentially and the second training symbol including a second CP and a second information block sequentially, the method comprises:

generating randomly the first information block with a length N by a first training symbol information block generator, wherein N is a natural number;

copying the last L samples of the first information block to the beginning of the block as the first CP by a first CP generator, wherein L is a natural number less than N;

generating the second information block with the length N by the first information block of the first training symbol in a circle manner in which the last d samples of the first information block are shifted to the position before the rest (N−d) samples and the N samples thus rearranged forms the second information block by a second training symbol information block generator, wherein the corresponding relation between the first and second information blocks is the structure characteristic of the cyclic training sequence, and d is 0 or any natural number less than N; and copying the last L samples of the second information block to the beginning of the block as the second CP to form the integrated cyclic training sequence by a second CP generator.

2. A communication method using the cyclic training sequence generated according to the method of claim 1, the communication method comprising:

a user sending an access request to the base station through a common control channel;

after receiving the access request from the user, the base station searching for the unallocated training sequences in the cyclic training sequence resource table, which contains a plurality of cyclic training sequences with different structure characteristics;

the base station selecting an unallocated cyclic training sequence from those retrieved, transmitting a response message to a terminal about the allocation of the cyclic training sequences, and refreshing the allocation states of the cyclic training sequences in the cyclic training sequence resource table of the base station, wherein the response message includes the specific structure characteristic of the cyclic training sequence;

the terminal generating a cyclic training sequence corresponding to the specific structure characteristic of the cyclic training sequence in the response message, adding data symbols, creating an integrated frame, and transmitting the integrated frame to the base station; and the receiving means of the base station performing timing synchronization and carrier frequency offset estimation for the transmitted signal, and after demodulation and decoding, recovering the transmitted signal.

3. A communication system comprising:

a terminal including a training sequence generator and a data symbol adder, wherein the training sequence generator generates a cyclic training sequence corresponding to the structure characteristic of the specific cyclic training sequence allocated by the base station, and the data symbol adder adds some data symbols and to create an integrated frame accordingly which is to be transmitted as a transmitting signal; and a base station to perform timing synchronizing and carrier frequency offset for the received signal with the specific cyclic training sequence and to recover the transmitting signal after demodulation and decoding;

wherein the training sequence generator includes:

an encoder to randomly encode the data;

a data modulator to modulate the signal outputted from the encoder;

a first training symbol information block generator to generate the first information block with a length N of the specific cyclic training sequence according to the demodulated code outputted from the data modulator, where N is a natural number;

a first CP generator to copy the last L samples of the first information block to the beginning of the block as CP according to the first information block generated by the first training symbol information block generator, where L is a natural number less than N;

a second training symbol information block generator to shift the last d samples of the first information block to the position before the rest (N−d) samples and to form the second information block by the N samples rearranged according to the structure characteristics of the specific cyclic training sequence and d is 0 or any number less than N; and a second CP generator to copy the last L samples of the second information block to the beginning of the block as CP according to the second information block generated by the second training symbol information block generator.

4. The communication system as defined in claim 3, wherein the base station includes a receiver that contains a plurality of receivers corresponding to a plurality of cyclic training sequences of different structure characteristics, wherein each receiver corresponds to one terminal and the specific cyclic training sequence of the terminal allocated by the base station, and includes:

a synchronization and carrier frequency offset unit to perform timing synchronization and carrier frequency offset estimation for the received data with the structure characteristic of the specific cyclic training sequence;

a demodulator to demodulate the output of the synchronization and carrier frequency offset means; and a decoder to decode the output of the demodulator in order to recover the signal from the user.

5. The communication system as defined in claim 4, wherein the synchronization and carrier frequency offset unit includes a timing metric and carrier frequency offset estimator, a timing synchronization and a carrier frequency offset compensation unit, wherein the timing synchronization unit is operable to synchronize the data sequences received by the base station with the timing metric and carrier frequency offset estimation means;

the timing metric and carrier frequency offset estimator is operable to search the received data sequence sample by sample for the beginning of the cyclic training sequence specific to the user according to the structure characteristic of the cyclic training sequence allocated by the base station, and to implement carrier frequency offset estimation after timing synchronization; and the carrier frequency offset compensation unit is operable to compensate the carrier frequency offset for the user with the result of the carrier frequency offset estimation obtained by the timing metric and carrier frequency offset estimation means.

6. The communication system as defined in claim 5, wherein the timing metric and carrier frequency offset estimator utilizes the timing metric $M_d(\theta)$ specific to the structure characteristic of the cyclic training sequence to search the received data sequence $r(z)$ sample by sample and determines the position where $M_d(\theta)$ is the local peak as the beginning position of the cyclic training sequence of the data sequence $r(z)$; and the timing metric and carrier frequency offset estimator utilizes the carrier frequency offset estimation $\epsilon_d^\wedge$ specific to the structure characteristic of the cyclic training sequence and the beginning position of the cyclic training sequence of the data sequence $r(z)$ to perform carrier frequency offset estimation for the user; wherein $$M_d(\theta) = \frac{\left|\sum_{z=\theta}^{N+\theta-1-d}\Phi_{d,z} + \sum_{k=\theta}^{d+\theta-1}\Psi_{d,k}\right|^2}{\left[\sum_{p=\theta}^{N+\theta-1}\left(|r(p+L)|^2 + |r(N+p+2L)|^2\right)\right]^2}$$

$$\Phi_{d,z} = r^*(L+z)r(N+2L+d+z)\neg$$

$$\Psi_{d,k} = r^*(N+L-d+k)r(N+2L+k)\neg$$

$\theta$ is an index and the index of the first sample in the data sequence $r(z)$ is 0, d is a natural number corresponding to the structure characteristic of the cyclic training sequence, N is the length of the first or second information block of the cyclic training sequence and $r^*(L+z)$ is the conjugation of $r(L+z)$, $$\hat{\epsilon}_d = \frac{N}{2\pi} \cdot \frac{(N-d)(N+L+d)\arg\left\{\sum_{z=0}^{N-1-d}\Phi_{d,z}\right\} + d(L+d)\arg\left\{\sum_{k=0}^{d-1}\Psi_{d,k}\right\}}{(N-d)(N+L+d)^2 + d(L+d)^2},$$

$$\arg\left\{\sum_{z=0}^{N-1-d}\Phi_{d,z}\right\} \text{ and } \arg\left\{\sum_{k=0}^{d-1}\Psi_{d,k}\right\}$$

are the complex angels of $$\sum_{z=0}^{N-1-d}\Phi_{d,z} \text{ and } \sum_{k=0}^{d-1}\Psi_{d,k}$$

respectively.

* * * * *